United States Patent
Kamath et al.

(10) Patent No.: US 8,806,063 B1
(45) Date of Patent: Aug. 12, 2014

(54) ENHANCED PULSE ASSISTED TIME SYNCHRONIZATION PROTOCOL

(75) Inventors: Prakash Kamath, San Jose, CA (US); Apurva Mehta, Cupertino, CA (US); Kamatchi Gopalakrishnan, Milpitas, CA (US); Rajagopalan Subbiah, San Jose, CA (US); Rohit Puri, Sunnyvale, CA (US); Vikram Bobade, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

(21) Appl. No.: 13/180,286

(22) Filed: Jul. 11, 2011

(51) Int. Cl.
  *G06F 1/12* (2006.01)
  *G06F 15/16* (2006.01)
  *H04J 3/06* (2006.01)

(52) U.S. Cl.
  USPC .......................................... 709/248; 370/503

(58) Field of Classification Search
  USPC ......................................................... 709/248
  See application file for complete search history.

(56) References Cited

U.S. PATENT DOCUMENTS

| | | | |
|---|---|---|---|
| 6,199,169 B1 * | 3/2001 | Voth ............................... | 713/400 |
| 7,602,702 B1 | 10/2009 | Aggarwal | |
| 7,668,151 B2 * | 2/2010 | Ryu et al. ...................... | 370/350 |
| 2002/0078243 A1 * | 6/2002 | Rich et al. ..................... | 709/248 |
| 2005/0124306 A1 * | 6/2005 | Cheng ......................... | 455/158.4 |
| 2005/0200393 A1 * | 9/2005 | Furtner ......................... | 327/291 |
| 2008/0044181 A1 | 2/2008 | Sindhu | |
| 2008/0046139 A1 * | 2/2008 | Basilico .......................... | 701/21 |
| 2009/0086764 A1 * | 4/2009 | Lee et al. ...................... | 370/503 |
| 2009/0310625 A1 * | 12/2009 | Roberts et al. ................ | 370/498 |
| 2010/0161723 A1 * | 6/2010 | Bryce et al. ................... | 709/203 |
| 2011/0103329 A1 * | 5/2011 | Baek et al. .................... | 370/329 |
| 2011/0296226 A1 * | 12/2011 | Sorbara et al. ................ | 713/400 |
| 2012/0263220 A1 * | 10/2012 | Li et al. ......................... | 375/224 |

* cited by examiner

*Primary Examiner* — Kamal Divecha
*Assistant Examiner* — Juan C Turriate Gastulo
(74) *Attorney, Agent, or Firm* — Shumaker & Sieffert, P.A.

(57) ABSTRACT

A network device may include a timing module and at least one interface. The timing module determines a local time of the network device indicating when the network device sends a synchronization start message. The at least one interface sends the synchronization start message to a time client device to set the current time of day on the time client device, receives a synchronization response message from the time client device indicating that the current time of day of the time client device was set, and sends a synchronization success message to the time client device indicating that the time client device has correctly set its current time of day.

18 Claims, 5 Drawing Sheets

US 8,806,063 B1

ENHANCED PULSE ASSISTED TIME SYNCHRONIZATION PROTOCOL

TECHNICAL FIELD

This disclosure relates to computer networks and, more particularly, to time synchronization within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may includes routers, switches, gateways, firewalls and a variety of other devices.

In many networks, it is important for nodes within the network to have accurate current time information. For example, accurate time information (i.e., time of day) may be necessary for computing timing delays for communicating packets between network nodes. Accurate timing information regarding the transit time of packets may be important to assess network efficiency and to ensure quality of service and performance measures. As an example, transit-delayed packets may result in interrupted audio service in voice over Internet Protocol (VoIP) applications. To correctly assess the timing information, it is important for the current time on all the interconnected computing devices of the network to be accurately synchronized to a primary reference time. The primary reference time may be provided by a primary reference clock source device, such as a GPS.

Typically, some network nodes are configured as time server nodes to determine the primary reference time and deliver that time to other nodes configured as time client nodes. Common examples of such nodes include routers within a service provider network. The time client node will typically send an acknowledgment to the server node which may be the only entity capable of confirming accurate time synchronization. Some networks use specific synchronization protocols that specify and require a maximum one second round trip delay between delivery of the primary reference time by the server node and response by the client node. As such, although providing for guaranteed time synchronization, the timing constraints and requirements of the protocols may be challenging to meet.

SUMMARY

The techniques described herein are directed to time synchronization between network nodes in a manner that allows some of the strict timing constraints of synchronization protocols to be removed. Rather than require that network nodes adhere to a one second round trip delay between nodes in order to successfully synchronize time between these nodes, the techniques described herein allow this limitation to be removed or significantly reduced to only require a maximum one-way delay of one second. In other words, the techniques do not require the nodes to strictly comply with a maximum one second round trip delay or, for that matter, any limitation on the round trip delay but nevertheless maintain the same guarantee of synchronization of current time between the nodes. The removal of the maximum round trip time limitation may significantly improve time synchronization between network nodes, especially during periods of high data traffic and/or CPU processor load that may otherwise result in conventional systems.

In one embodiment, a method comprises sending, with a time server, a synchronization start message to a time client device to set a current time of day on the time client device. The synchronization start message includes a local time of the time server indicating when the time server sent the synchronization start message. The method further comprises receiving, with the time server, a synchronization response message from the time client device indicating that the current time of day of the time client device was set based on the local time of the time server as included within the synchronization start message. The synchronization response message includes a local time of the time client device indicating when the synchronization response message was sent by the time client device. The method further comprises determining, with the time server, a local time of the time server indicating when the time server received the synchronization response message, determining, with the time server, the time difference between the local time of the time server indicating when the time server received the synchronization response message and the local time of the second device as included in the synchronization response message indicating when the synchronization response message was sent by the time client device, and when the time server determines that time difference is less than a threshold amount of time, sending, with the time server, a synchronization success message to the time client device indicating that the time client device has correctly set its current time of day.

In another embodiment, a method comprises receiving, with a time client device, a synchronization start message from a time server. The synchronization start message includes a local time of the time server indicating when the synchronization start message was sent by the time server. The method further comprises setting, with the time client device, a current time of day of the time client device based on the local time of the time server as included within the synchronization start message, and sending, with the time client device, a synchronization response message to the time server to indicate that the current time of day of the time client device was set. The synchronization response message includes a local time of the time client device indicating when the time client device sent the synchronization response message.

In another embodiment, a network device comprises a timing module that determines a local time of the network device indicating when the network device sends a synchronization start message, and at least one interface that sends the synchronization start message to a time client device to set a current time of day on the time client device, receives a synchronization response message from the time client device indicating that the current time of day of the time client device was set, and sends a synchronization success message to the time client device indicating that the time client device has correctly set its current time of day. The synchronization start message includes a local time of the network device indicating when the network device sent the synchronization start message. The synchronization response message includes a local time of the time client device indicating when the synchronization response message was sent by the time client device. The timing module determines a time difference between the local time of the network device indicating when the network device received the synchronization response message and the local time of the time client device as included in the synchronization response message indicating when the synchronization response message was sent by the time client device. The interface sends the synchronization success message when the timing module determines that the time difference is less than a threshold time value In another embodiment, a network device comprises at least one interface that receives a synchronization start message from a time server. The synchronization start message includes a local time of the time server indicating when the synchronization start message was sent by the time server. The network device further comprises a timing module that sets a current time of day of the network device based on the local time of the time server as included within the synchronization start message, and determines a local time of the network device indicating when the network device sends a synchronization response message. The at least one interface sends the synchronization response message to a time server to indicate that the current time of day of the network device was set. The synchronization response message includes the local time of the network device indicating when the network device sends the synchronization response message.

The details of one or more aspects of this disclosure are set forth in the accompanying drawings and the description below. Other features, objects, and advantages of this disclosure will be apparent from the description and drawings, and from the claims.

DETAILED DESCRIPTION

Figure 1:
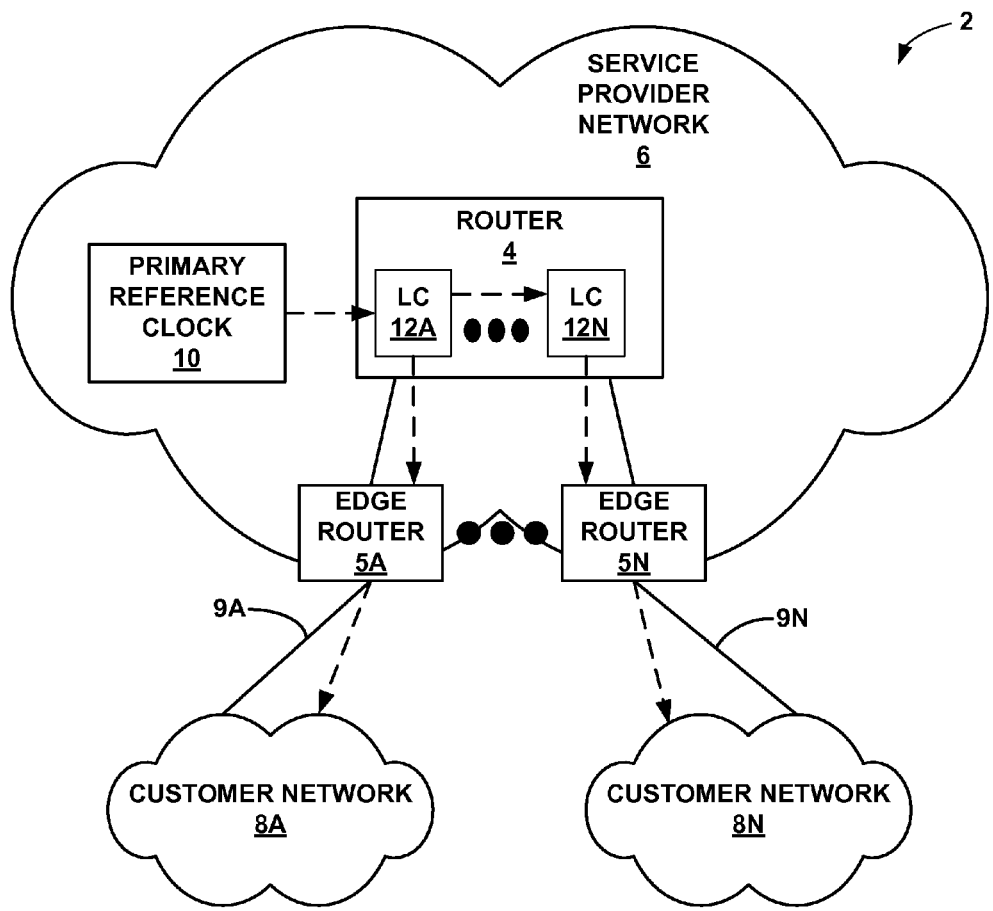
FIG. 1 is a block diagram illustrating an example computing environment in which network nodes are synchronized to a primary reference clock.

FIG. 1 is a block diagram illustrating an example network environment 2 in which network nodes are synchronized to a primary reference clock 10. While described with respect to routers and line cards of routers, the time synchronization techniques described in this disclosure may be implemented by any network device capable of delivering time information.

As shown in FIG. 1, router 4 communicates with edge routers 5A-5N ("edge routers 5") to provide customer networks 8A-8N ("customer networks 8") with access to service provider network 6. Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. In another example, service provider network 6 may provide network services within the core of the Internet. In either case, service provider network 6 may include a variety of network devices other than router 4 and edge routers 5, such as additional routers, switches, servers, or other devices.

In the illustrated example, edge router 5A is coupled to customer network 8A via access link 9A and edge router 5N is coupled to customer network 8N via access link 9N. Customer networks 8 may be networks for geographically separated sites of an enterprise. Each of customer networks 8 may include one or more computing devices (not shown), such as personal computers, laptop computers, handheld computers, workstations, servers, switches, printers, and the like. The configuration of network 2 illustrated in FIG. 1 is merely exemplary. For example, an enterprise may include any number of customer networks 8.

In this example, router 4 is configured with a set of line cards 12A-12N ("LCs 12") for receiving and routing network packets. As is discussed in greater detail with respect to FIG. 2, each of the LCs 12 may include a packet forwarding engine (PFE) and a set of one or more individual interface cards (IFCs) for inbound and outbound network communication. In this way, router 4 communicates with edge routers 5 using LCs 12.

Router 4 may receive a primary reference time from a primary reference clock 10, such as a global positioning system (GPS). For example, primary reference clock 10 and router 4 may use the Institute of Electrical and Electronics Engineers (IEEE) 1588 Precision Time Protocol (PTP), with primary reference clock 10 configured as a grandmaster clock and router 4 configured as a slave clock, to synchronize the local time of router 4 to the primary reference time. In the example of FIG. 1, primary reference clock 10 is part of service provider network 6. However, primary reference clock 10 may be part of one or more networks coupled to service provider network 6. Router 4 may receive the primary reference time at one of LCs 12 configured as a time client of primary reference clock 10. For example, LC 12A may receive the primary reference time from primary reference clock 10 and determine its local time based on the primary reference time.

LC 12A, acting as a time server line card, executes a synchronization protocol as described herein to deliver the primary reference time to another line card of router 4 (e.g., LC 12B), acting as a time client line card. Similarly, the client line card executes the synchronization protocol to communicate with the server line card to synchronize its local time to the primary reference time received from LC 12A. In such a way, the current time separately maintained by each of LCs 12 may be synchronized to each other based on a common primary reference time. In some examples, the techniques described in this disclosure may be implemented to achieve time synchronization between network nodes external to LCs 12, such as between edge routers 5.

As described herein, the network nodes of FIG. 1 (e.g., LCs 12, edge routers 5 and nodes within customer networks 8) may utilize a synchronization protocol that removes the maximum round trip delay of synchronization communications between nodes to only require a maximum one-way delay of one second while nevertheless maintaining the same guarantee of synchronization of current time between the nodes. For instance, LC 12A may obtain a primary reference time from primary reference clock 10. The removal of the maximum round trip time limitation on synchronization communications between the network nodes may significantly improve time synchronization between the nodes, especially during periods of high data traffic that may otherwise result in conventional systems.

Figure 2:
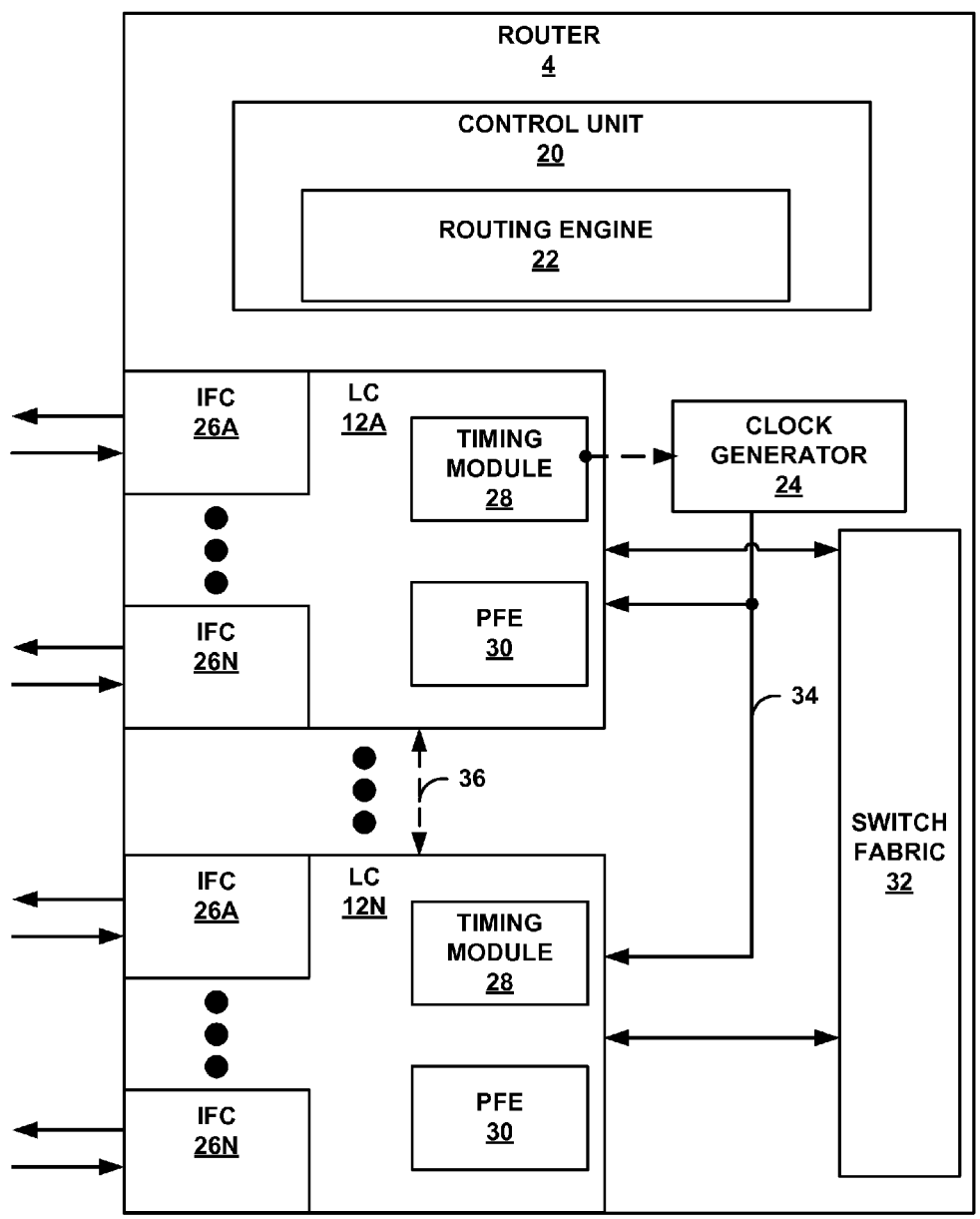
FIG. 2 is a block diagram illustrating an example router that implements the techniques described in this disclosure to time-synchronize network nodes.

FIG. 2 is a block diagram illustrating an example router 4 that implements the techniques described in this disclosure to time-synchronize network nodes. As shown in FIG. 2, in this example router 4 includes a control unit 20, a switch fabric 32, a clock generator 24, and a plurality of line cards 12A-12N ("LCs 12"). In general, switch fabric 32 provides a high-speed interconnect for forwarding incoming data packets to the correct line cards for transmission over a network, such as the large public network commonly referred to as the "Internet." U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Control unit 20 may represent one or more processors (not shown in FIG. 2) that provides an operating environment for executing software instructions, such as those used to define a software or computer program, stored to a non-transitory computer-readable medium (not shown in FIG. 2), such as a storage device (e.g., a disk drive, or an optical drive), or memory (such as Flash memory, random access memory or RAM) or any other type of volatile or non-volatile memory, that stores instructions to cause, when executed, one or more processors to perform the techniques described herein. Alternatively, control unit 20 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Often, even when implemented as dedicated hardware, the dedicated hardware supports execution of software that may implement one or more aspects of the techniques described in this disclosure. The techniques may therefore generally be implemented in hardware, or a combination of hardware and software. Although not shown in FIG. 2, LCs 12 may include a control unit similar to control unit 20 that may comprise a combination of dedicated hardware specially designed for packet processing and a central processing unit (CPU) for configuring this dedicated hardware and otherwise enabling communication between routing engine 22 and this dedicated hardware.

In general, control unit 20 provides control plane functionality for router 4 and, in this example, includes a routing engine 22. Routing engine 22 is responsible for maintaining network topology information, such as routing tables, executing routing protocols to communicate with peer routing devices to update the routing tables, and providing a management interface to allow user access and configuration of router 4. Additional example details on a router having multiple line cards operating as network nodes are described in U.S. Pat. No. 7,602,702, filed Feb. 10, 2005, entitled "FAST REROUTE OF TRAFFIC ASSOCIATED WITH A POINT TO MULTI-POINT NETWORK TUNNEL," the entire contents of which are incorporated herein by reference. Further details of one example embodiment of router 4 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

LCs 12 receive and send data packets with an external network, e.g., SP network 6, via an associated packet forwarding engine (PFE) 30 and a plurality of interface cards (IFCs) 26A-26N ("IFCs 26"). IFCs 26 may each represent an interface or port between a communication link and router 4 by which router 4 sends and receives data packets. LCs 12 send and receive data packets between LCs 12 via an internal communication link 36, such as an internal high-speed Ethernet connection. In some examples, LCs 12 may send and receive data packets between LCs 12 using switch fabric 32.

Clock generator 24 communicates a clock signal, such as a sequence of timing pulses, to each of LCs 12 using an electrical connection 34. As an example, clock generator 24 may be a FPGA configured to generate an electrical square wave such that the interval between at least one of the rising edges or falling edges of the square wave coincide with a particular time interval, such as a one second time interval. In some examples, clock generator 24 may generate a clock signal using a waveform such as a sinusoidal waveform, a triangle waveform, a saw-tooth waveform, and the like. In addition, clock generator 24 may generate the clock signal at any number of timing intervals, such as half-second intervals, quarter-second intervals, or other intervals. As one example, clock generator 24 may communicate a clock signal (e.g., a square wave) to each of LCs 12 using electrical connection 34 such that the elapsed time interval between the rising edges of the clock signal is one second. Because each of LCs 12 receives the clock signal through electrical connection 34, the clock signal is received at each of LCs 12 at substantially the same time. As such, the fractional portion of the unit seconds portion of the local time of each of LCs 12 may be substantially synchronized.

Timing module 28 may determine the local time of the line card, and may exchange data packets in accordance with the synchronization protocol described herein to synchronize the local times separately maintained by each of the line cards with a common primary reference time. Timing module 28 may be a software process, software thread, hardware component or other module that operates in accordance with the synchronization protocol described herein. As an example, LC 12A, configured as a server line card, may receive a primary reference time from primary reference clock 10. Timing module 28 may synchronize the local time of LC 12A to the primary reference time using a PTP protocol.

Timing module 28 of LC 12A sends a synchronization start message to LC 12B, configured as a client line card. The synchronization start message includes a local time of LC 12A, including at least a unit seconds portion and a fractional portion of the unit seconds portion, indicating when LC 12A sent the synchronization start message. In response to receiving the synchronization start message, timing module 28 of LC 12B determines the local time of LC 12B based on the local time of LC 12A included in the synchronization start message. For instance, timing module 28 of LC 12B may determine the unit seconds portion of the local time of LC 12B using the unit seconds portion of the time included in the synchronization start message, and may determine the fractional portion of the unit seconds portion using the common clock signal received from clock generator 24.

Timing module 28 of LC 12B sends a synchronization response message to LC 12A to confirm accurate time synchronization between LC 12A and LC 12B. The synchronization response message includes the local time of LC 12B indicating when LC 12B sent the synchronization response message. In response to receiving the synchronization response message, timing module 28 of LC 12A compares the local time of LC 12B included in the synchronization response message to a local time of LC 12A when LC 12A received the synchronization response message. If the difference between the two local times is less than one second, LC 12A determines that LC 12B has accurately synchronized its local time to the local time of LC 12A (and therefore to the primary reference time). As such, in contrast to some conventional protocols that require a maximum one second round trip delay between the sending of a synchronization start message by a time server such as LC 12A and the receipt of a synchronization response message by the time server, the synchronization protocol described herein imposes no theoretical maximum round trip time limit, but only a maximum one-way delay of one second.

Figure 3:
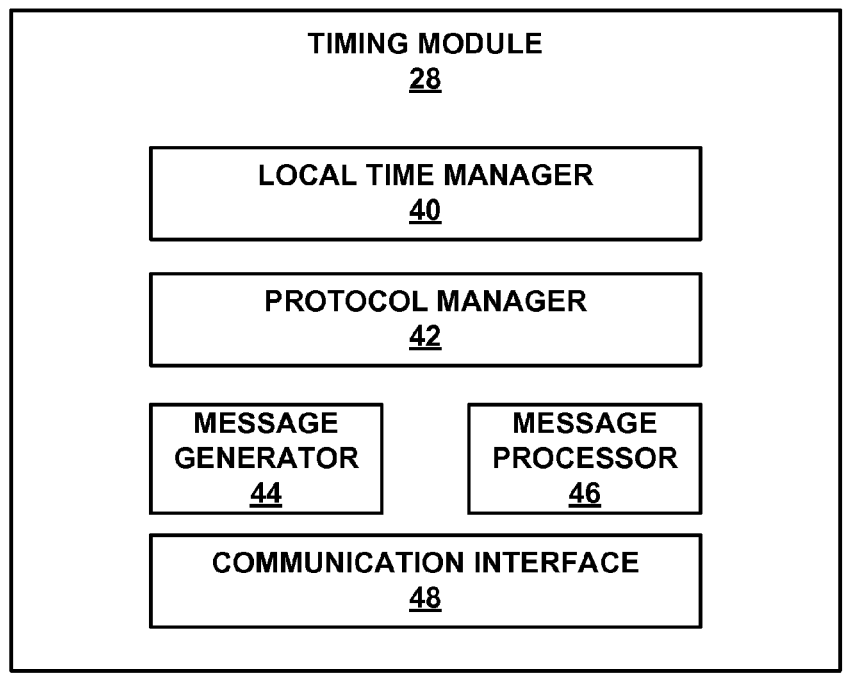
FIG. 3 is a block diagram illustrating one of the timing modules shown in the example of FIG. 2 in more detail.

FIG. 3 is a block diagram illustrating one of the timing modules 28 shown in the example of FIG. 2 in more detail. As shown in the example of FIG. 3, timing module 28 includes a local time manager 40, a protocol manager 42, a message generator 44, a message processor 46, and a communication interface 48. Although shown as separate components in FIG. 3, one or more of modules 40, 42, 44, 46, and 48 may be part of the same module. In some examples, one or more of modules 40, 42, 44, 46, and 48 may be software and/or firmware units that are executed on one or more processors of LCs 12 (not shown). For example, one or more of modules 40, 42, 44, 46, and 48 may represent dedicated hardware, such as one or more integrated circuits, one or more ASICs, one or more ASSPs, one or more FPGAs, or any combination of one or more of the foregoing examples, for performing the techniques described herein. In certain examples, even when implemented as dedicated hardware, the dedicated hardware supports execution of software that may implement one or more aspects of the techniques described in this disclosure. The techniques may therefore generally be implemented in hardware, or a combination of hardware and software.

Local time manager 40 determines the local time of the line card. The local time may include one or more of a unit years portion, a unit months portion, a unit days portion, a unit hours portion, a unit minutes portion, a unit seconds portion, and a fractional portion of the unit seconds portion. In some examples, the local time may be represented as an epoch time (i.e., an elapsed time interval since a known point in time), such as the portable operating system interface for Unix (POSIX) time represented by the number of seconds elapsed since midnight Coordinated Universal Time (UTC) of Jan. 1, 1970. For instance, the local time may be represented by the POSIX time of 1304519379 seconds, which corresponds to an absolute POSIX time of May 4, 2011 at 14 hours, 29 minutes, and 39 seconds UTC. Local time manager 40 may determine the local time in part using the clock signal delivered by clock generator 24. For instance, in an example where clock generator 24 is configured to deliver a square wave with one-second rising edge intervals, local time manager 40 increments the local time by one second each time local time manager 40 detects a rising edge of the timing square wave.

Protocol manager 42 executes the time synchronization protocol described herein to communicate between the line card and other network nodes. For example, protocol manager 42 manages the execution of the time synchronization protocol in response to control unit 20 configuring the line card to act as a server line card or a client line card. Protocol manager 42 uses one or more of message generator 44, message processor 46, and communication interface 48 to send and receive data packets to synchronize the local times between line cards. As described above, timing module 28 may communicate timing information in packetized form over a network connection in accordance with the synchronization protocols. As such, communication interface 48 may represent a network stack that packetizes messages produced by message generator 44 for communication over a network link, such as high-speed internal network link 36.

Message generator 44 generates messages as part of the synchronization protocol. For example, when the line card is configured as a server line card, message generator 44 generates a synchronization start message to initiate time synchronization between the server line card and a client line card. In addition, message generator 44 may generate a success message to be sent to a client line card indicating that the client line card has successfully synchronized its local time to the local time of the server line card. When the line card is configured as a client line card, message generator 44 generates a synchronization response message to be sent to a server line card.

Message processor 46 processes communications received by the line card, such as synchronization start messages and synchronization success messages. For example, when the line card is configured as a client line card, message processor 46 determines a local time of the server line card included in a synchronization start message indicating when the server line card sent the synchronization start message. When the line card is configured as a server line card, message processor 46 determines a local time of the client line card included in a synchronization response message indicating when the client line card sent the synchronization response message.

In either configuration (i.e., server line card configuration or client line card configuration), protocol manager 42 uses information obtained from message processor 46 and local time manager 40 to manage communications in accordance with the synchronization protocol described herein. For instance, when the line card is configured as a server line card, protocol manager 42 compares the server local time indicating when a synchronization response message was received by the client line card to a client local time included in the synchronization response message to a threshold value, such as one second. Based on the comparison, protocol manager 42 may determine that the client line card has successfully synchronized the client local time to the server local time, and may direct message generator 44 to send a synchronization success message data packet to the client line card indicating the successful time synchronization. Similarly, protocol manager 42 may determine, based on the comparison, that the client line card has not successfully synchronized the client local time to the server local time, and may direct message generator 44 to send another synchronization start message to further attempt successful time synchronization.

Protocol manager 42 uses communication interface 48 to effect communications used in the time synchronization protocol. For example, communication interface 48 may use a internal communication link 36 to send and receive data packets, such as synchronization start, synchronization response, and synchronization success message data packet. In some examples, communication interface 48 may use one or more of IFCs 26 to send and receive data packets over a network, such as service provider network 6, to a network device such as edge routers 5.

As an example, LC 12A, configured as a server line card, may receive a primary reference time, such as from primary reference clock 10. Local time manager 40 synchronizes the local time of LC 12A to the primary reference time using, for example, a PTP protocol. Protocol manager 42 directs message generator 44 to generate a synchronization start message to be sent to a client line card (e.g., LC 12B). Message generator 44 generates the synchronization start message, including at least a unit seconds portion and a fractional portion of the unit seconds portion of the local time of LC 12A indicating when the synchronization start message is sent. Protocol manager 42 sends the synchronization start message to LC 12B using communication interface 48.

Communication interface 48 of LC 12B receives the synchronization start message, and message processor 46 of LC 12B determines the local time of LC 12A included in the synchronization start message. Protocol manager 42 of LC 12B directs local time manager 40 to determine the local time of LC 12B based on the local time of LC 12A included in the synchronization start message. Protocol manager 42 of LC 12B directs message generator 44 of LC 12B to generate a synchronization response message including at least a unit seconds portion and a fractional portion of the unit seconds portion of the local time of LC 12B when the synchronization response message is sent. Protocol manager 42 of LC 12B sends the synchronization response message to LC 12A using communication interface 48.

Communication interface 48 of LC 12A receives the synchronization response message, and message processor 46 of LC 12A determines the local time of LC 12B included in the synchronization response message. Protocol manager 42 of LC 12A uses local time manager 40 to determine a local time of LC 12A when LC 12A received the synchronization response message, and compares the received time of the synchronization response message to the time included in the synchronization response message indicating when LC 12B sent the synchronization response message. If the difference between the times is less than one second, protocol manager 42 of LC 12A may determine that LC 12B has accurately synchronized its local time to the local time of LC 12A. In response, protocol manager 42 of LC 12A may direct message processor 46 of LC 12A to generate a synchronization success message, and may send the synchronization success message to LC 12B using communication interface 48.

Figure 4:
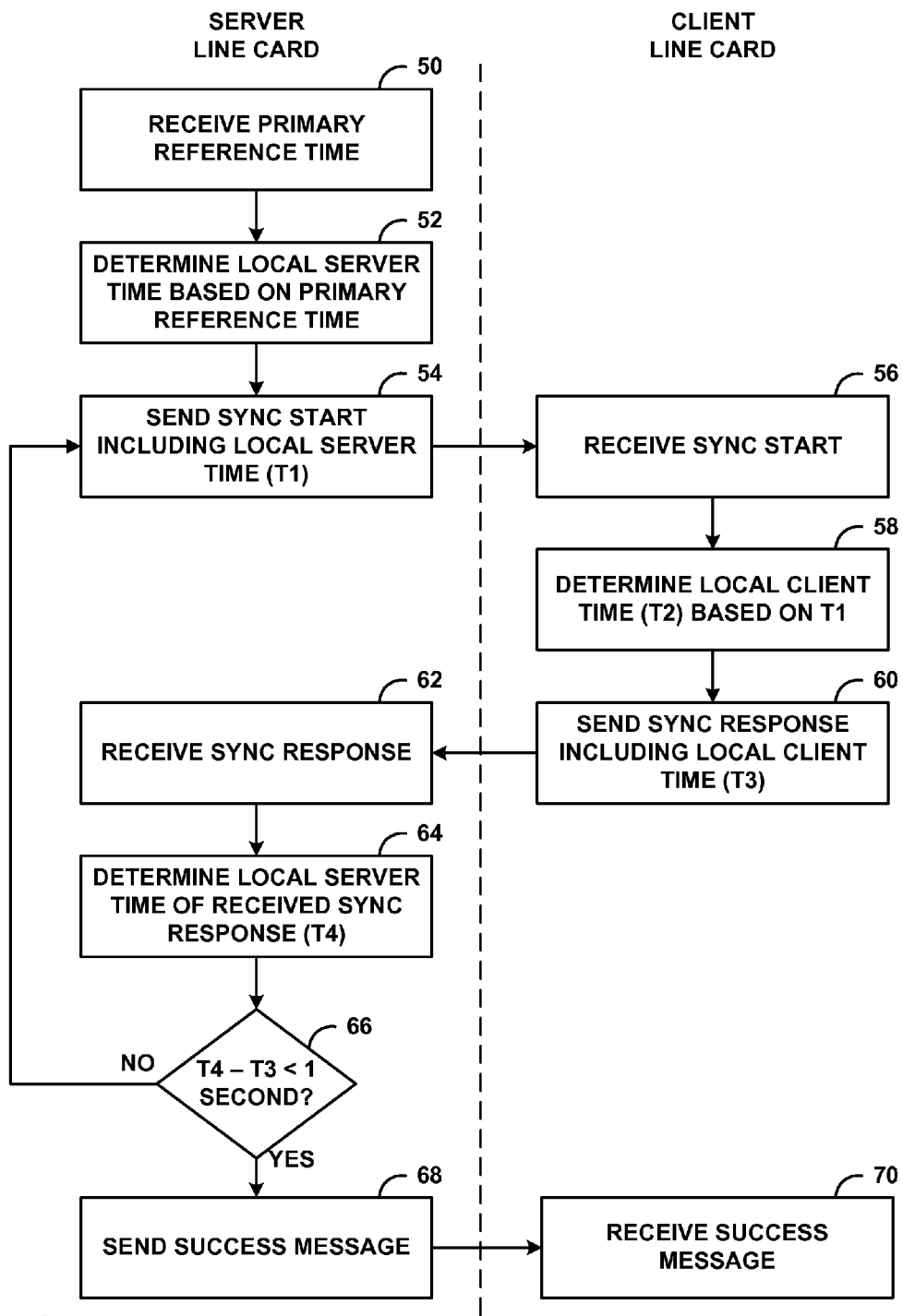
FIG. 4 is a flowchart illustrating an example operation of time synchronization between network nodes in accordance with the techniques described in this disclosure.

FIG. 4 is a flowchart illustrating an example operation of time synchronization between network nodes in accordance with the techniques described in this disclosure. While described with respect to line cards of a router, the example operation of FIG. 4 may be implemented by any network device capable of delivering time information. For example, the techniques may be implemented between routers of a network, or between line cards of different routers.

LC 12A, configured as a server line card, receives a primary reference time from primary reference clock 10 (50). The primary reference time may include a unit hours portion, a unit minutes portion, a unit seconds portion, and a fractional portion of the unit seconds portion. In some examples, the primary reference time may be represented as an epoch time, such as a POSIX time representing the number of seconds elapsed since midnight Coordinated Universal Time (UTC) of Jan. 1, 1970.

Local time manager 40 of timing module 28 of LC 12A determines the local time of LC 12A (i.e., the local server time), based on the primary reference time (52). For example, local time manager 40 may synchronize the local server time of LC 12A to a primary reference POSIX time received from primary reference clock 10 using the IEEE 1588 PTP protocol. Local time manager 40 determines the local server time by incrementing the local server time (synchronized to the primary reference time) by a preconfigured time interval when LC 12A receives a timing pulse from clock generator 24. For instance, in the example where clock generator 24 is configured to deliver a square wave with one-second rising edge intervals, local time manager 40 increments the primary reference time by one second each time local time manager 40 detects a rising edge of the timing square wave.

Protocol manager 42 of timing module 28 may configure clock generator 24 to shift the phase of the clock signal based on the primary reference time. As an example, timing module 28 may configure clock generator 24 to deliver the next rising or falling edge of the clock signal (e.g., a square wave, sinusoidal wave, saw-tooth wave, triangle wave, etc.) at a time subsequent to the primary reference time. Clock generator 24 may shift the phase of the clock signal such that at least one of a rising or falling edge of the clock signal corresponds to the next consecutive value of the unit seconds portion of the primary reference time when the fractional portion of the unit seconds portion of the primary reference time is zero.

As an example, timing module 28 may receive a primary reference time of 15.600 seconds, such as from primary reference clock 10. Protocol manager 42 may configure clock generator 24 to shift the phase of the clock signal such that at least one of the next immediate rising or falling edge of the clock signal corresponds to a time when the primary reference time is 16.000 seconds. In such an example, protocol manager 42 may accurately synchronize the clock signal generated by clock generator 24 to the unit seconds portion of the primary reference time.

Similarly, clock generator 24 delivers the synchronized clock signal (e.g., a square wave with one-second rising edge intervals) to each of LCs 12 using electrical connection 34 to accurately synchronize the fractional portion of the unit seconds portion of the local time of each of LCs 12 to the fractional portion of the unit seconds portion of the primary reference time. However, while the local server time is synchronized with the primary reference time, the portions of the local client time other than the fractional portion of the unit seconds (i.e., unit seconds portion, unit minutes portion, unit hours portion, etc.) may not be synchronized with the primary reference time until the absolute primary reference time is delivered to the client line card by the server line card.

Message generator 44 of timing module 28 of LC 12A, configured as a server line card, sends a synchronization start message to a line card that is acting as a time client (e.g., LC 12B) (54). The synchronization start message includes the local time of LC 12A (T1), based on the primary reference time, indicating when LC 12A sent the synchronization start message. In some examples, the local time T1 includes a unit seconds portion and a fractional portion of the unit seconds portion. In certain examples, the local time T1 includes an epoch time, such as a POSIX time, representing the number of seconds that have elapsed since a known time.

Message processor 46 of timing module 28 of the client line card (e.g., LC 12B) receives the synchronization start message from the server line card using communication interface 48 (56). The client line card determines a local time of the client line card (T2) based on the time included in the synchronization start message indicating when the server line card sent the synchronization start message (58). For example, local time manager 40 of the client line card may determine the fractional portion of the unit seconds portion of the local client time when the client line card received the synchronization start message.

Because the synchronization start message may be delayed in transit, such as by intrinsic hardware transport layer delays, the time at which the client line card received the synchronization start message is not likely the same as the time at which the server line card sent the synchronization message. However, because the client line card is accurately synchronized only to the fractional portion of the unit seconds portion of the primary reference time (e.g., by a square wave clock signal delivered by clock generator 24 with one-second rising edge intervals), the client line card has no way of determining whether the synchronization start message was delayed by more than one second. As such, local time manager 40 of the client line card determines the local client time using the unit seconds portion of the time T1 indicating when the server line card sent the synchronization start message.

In examples where the fractional portion of the unit seconds portion of the local client time when the client line card received the synchronization start message is greater than the fractional portion of the unit seconds portion of T1, the client line card determines its local client time using the same value of the unit seconds portion of T1. In examples where the fractional portion of the unit seconds portion of the local client time when the client line card received the synchronization start message is less than the fractional portion of the unit seconds portion of T1, the client line card determines its local client time by adding one second to the value of the unit seconds portion of T1.

After determining the local client time based on the time T1 included in the synchronization start message, the client line card further determines its local client time by incrementing the local client time using the clock signal delivered to the client line card by clock generator 24. For instance, in the example where clock generator 24 is configured to deliver a timing signal comprising a square wave with one-second rising edge intervals, local time manager 40 of the client line card increments the local client time by one second each time the client line card detects a rising edge of the clocking square wave.

The client line card sends a synchronization response message to the server line card (60). The synchronization response message includes the local client time (T3) indicating when the client line card sent the synchronization response message. In some examples, the local time T3 includes a unit seconds portion and a fractional portion of the unit seconds portion. In certain examples, the local time T3 includes an epoch time, such as a POSIX time, representing the number of seconds that have elapsed since a known time.

The server line card receives the synchronization response message from the client line card (62). Local time manager 40 of the server line card determines a local time of the server line card (T4), based on the primary reference time, indicating when the server line card received the synchronization response message (64).

Protocol manager 42 of the server line card determines whether the difference between the time T4 (the local server time indicating when the server line card received the synchronization response message) and the time T3 (the local client time indicating when the client line card sent the synchronization response message) is less than one second (66). However, one or more of the synchronization start message or the synchronization response message may have been delayed in transit. If either of the synchronization messages were delayed in transit by more than one second, the server line card cannot unambiguously determine whether the client line card has accurately synchronized its local client time to the primary reference time.

For instance, in an example where the synchronization start message is delayed in transit by more than one second, the client line card determines its local client time using the value of the unit seconds portion of the time T1 (indicating when the server line card sent the synchronization start message), but does not account for that portion of the transit delay that exceeds one second. As such, the client line card does not correctly synchronize its local client time to the primary reference time, and the difference between time T4 and time T3 is greater than one second.

In an example where the synchronization start message is not delayed in transit by more than one second, but the synchronization response message is delayed by more than one second, the client line card correctly synchronizes its local client time to the primary reference time. In such an example, the difference between time T4 and time T3 is greater than one second due to the transit delay of the synchronization response message. However, the server line card cannot unambiguously determine whether the difference between time T4 and time T3 is greater than one second due to a transit delay of the synchronization start message (in which case the client line card will not correctly synchronize its local client time to the primary reference time), or whether the difference is due to a transit delay of the synchronization response message (in which case the client line card may have correctly synchronized its local client time to the primary reference time).

However, there is no theoretical upper limit to the time delay between the time when the client line card receives the synchronization start message (T2) and when the client line card sends the synchronization response message (T3). For example, the client line card may receive a synchronization start message from the server line card while the client line card is performing other operations, such as sending or receiving data packets to one or more downstream clients, such as edge routers 5. The client line card may determine that sending a synchronization response message to the server line card is of a lower priority than performing other operations, and may therefore delay its response to the server line card. However, the server line card may determine that the client line card has accurately synchronized its local client time to the primary reference time based on the difference between the local server time when the server line card received the synchronization response message and the time included in the synchronization response message indicating the local client time when the client line card sent the synchronization response message. As such, the techniques of this disclosure impose no theoretical maximum round trip time limit between the time when the synchronization start message is sent and the time when the synchronization response message is received.

The server line card therefore determines whether the difference between time T4 and time T3 is less than one second (66). When the difference between time T4 and time T3 is not less than one second ("NO" branch of 66), message generator 44 of the server line card sends another synchronization start message to the client line card including a local server time T1 indicating when the server line card sent the synchronization start message. When the difference between time T4 and time T3 is less than one second ("YES" branch of 66), the server line card determines that the client line card has correctly synchronized its local client time to the primary reference time. The server line card sends a synchronization success message data packet to the client card, indicating that the client line card has successfully synchronized its local client time to the local server time (68). Because the local server time is synchronized to the primary reference time, the local client time, through its synchronization with the local server time, is also synchronized to the primary reference time.

Message processor 46 of the client line card receives the success message data packet from the server line card (70). The success message data packet may indicate that the client line card has correctly synchronized its local time to the local server time, and therefore that the client line card has correctly set its current time of day.

Figure 5:
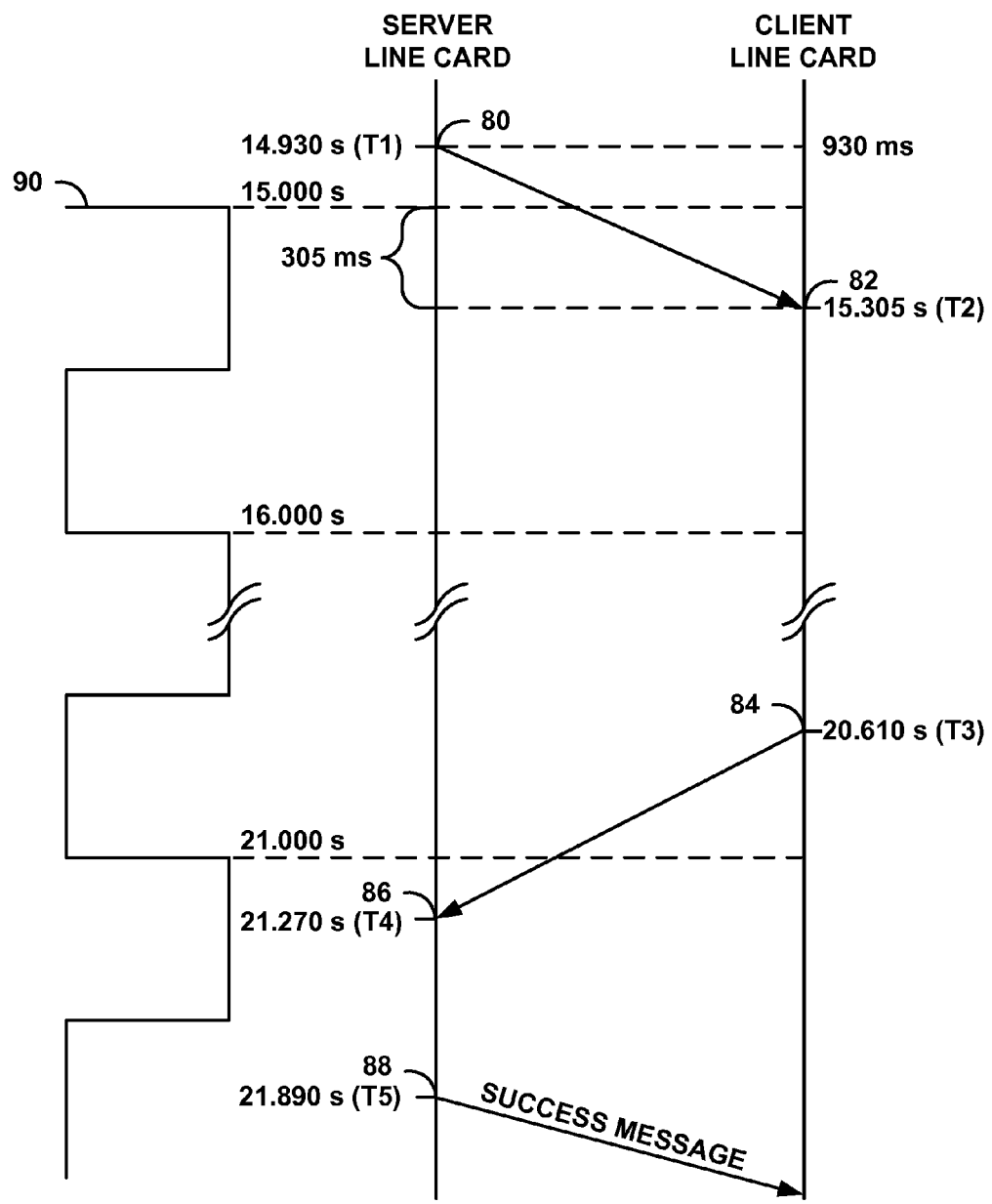
FIG. 5 is a timing diagram illustrating an example operation of time synchronization between network nodes in accordance with the techniques described in this disclosure.

FIG. 5 is a timing diagram illustrating an example operation of time synchronization between network nodes in accordance with the techniques described in this disclosure. While described with respect to line cards of a router, the example operation of FIG. 5 may be implemented by any network device capable of delivering time information. In the example of FIG. 5, a server line card (e.g., LC 12A acting as a time server line card) sends a synchronization start message to a client line card (e.g., LC 12 B acting as a time client line card) (80). The synchronization start message includes the local server time, 14.930 seconds (T1), indicating when the synchronization start message was sent by the server line card. A clock signal 90 is delivered to the server line card and the client line card, such as by clock generator 24. In the illustrated example, clock signal 90 comprises a square wave with one-second rising edge intervals. The server line card determines the local time of the server line card (i.e., the local server time) by incrementing the unit seconds portion of the local server time to the next consecutive unit seconds value each time the server line card detects a rising edge of clock signal 90. Similarly, the client line card increments the unit seconds portion of the local client time each time the client line card detects a rising edge of clock signal 90. As such, the fractional portion of the unit seconds portion of both the local server time and the local client time are accurately synchronized using clock signal 90.

The client line card receives the synchronization start message and determines a local client time indicating when the client line card received the synchronization start message (82). In the illustrated example, the synchronization start message is sent by the server line card when the fractional portion of the unit seconds portion of the local server time and the local client time is equal to a value of 930 milliseconds. However, the client line card receives the synchronization start message when the fractional portion of the unit seconds portion of the local server time and the local client time is equal to a value of 305 milliseconds. Because the value of the fractional portion of the unit seconds portion of the local client time when the client line card received the synchronization start message is less than the value of the fractional portion of the unit seconds portion of the time T1 included in the synchronization start message, the client line card determines its local client time by adding one second to the value of the unit seconds portion of T1. Therefore, the client line card determines its local client time as 15.305 seconds.

The client line card sends a synchronization response message to the server line card (84). In the illustrated example, the synchronization response message includes the local client time of 20.610 seconds (T3), indicating when the client line card sent the synchronization response message. The server line card receives the synchronization response message and determines the local server time of 21.270 seconds (T4), indicating when the server line card received the synchronization response message (86). The server line card determines that the difference between time T4 and time T3 (21.270–20.610) is less than one second. In response, the server line sends a synchronization success message to the client line card at a time of 21.890 seconds (T5), indicating that the difference between time T4 and time T3 is less than one second and the client line card has successfully synchronized the local client time to the local server time (88).

Various embodiments of the techniques have been described. These and other embodiments are within the scope of the following claims.

The invention claimed is:

1. A method comprising:
sending, with a time server, a synchronization start message to a time client device to set a current time of day on the time client device, wherein the synchronization start message includes a local time of the time server indicating when the time server sent the synchronization start message;

receiving, with the time server, a synchronization response message from the time client device indicating that the time client device received the synchronization start message and performed an operation of setting the current time of day of the time client device based on the local time of the time server as included within the synchronization start message, wherein the synchronization response message includes a local time of the time client device indicating when the synchronization response message was sent by the time client device after setting the current time of day at the time client device, wherein the local time of the time client device indicating when the synchronization response message was sent by the time client device is different than a time at which the time client device received the synchronization start message;

determining, with the time server, a local time of the time server indicating when the time server received the synchronization response message;

receiving, with the time server, a primary reference time, wherein the local time of the time server indicating when the time server sent the synchronization start message and the local time of the time server indicating when the time server received the synchronization response message are based on the primary reference time;

phase shifting, with a clock generator of the time server, at least one of a rising or falling edge of a clock signal of the time server based on the primary reference time such that the at least one of the rising or falling edge occurs at a time subsequent to the primary reference time;

determining, with the time server, the time difference between the local time of the time server indicating when the time server received the synchronization response message and the local time of the time client device as set based on the local time of the time server as included in the synchronization response message indicating when the synchronization response message was sent by the time client device; and when the time server determines that the time difference is less than a threshold amount of time, sending, with the time server, a synchronization success message to the time client device indicating that the time client device has correctly set its current time of day.

2. The method of claim 1, wherein the threshold amount of time is one second.

3. The method of claim 1, wherein the primary reference time comprises a first unit seconds portion, and a first fractional portion of the first unit seconds portion, wherein the time subsequent to the primary reference time comprises a second unit seconds portion, and a second fractional portion of the second unit seconds portion, wherein the second unit seconds portion comprises a value that is a next consecutive value of the first unit seconds portion, and wherein the second fractional portion of the second unit seconds portion comprises a value of zero.

4. The method of claim 1, wherein the local time of the time server indicating when the time server sent the synchronization start message, the local time of the time client device as included in the synchronization response message, and the local time of the time server indicating when the time server received the synchronization response message each comprise unit seconds portions and fractional portions of the unit seconds portions.

5. The method of claim 1, wherein the time server comprises a first line card of a router, and wherein the time client device comprises a second line card of the router.

6. A method comprising:
receiving, with a time client device, a synchronization start message from a time server, wherein the synchronization start message includes a local time of the time server indicating when the synchronization start message was sent by the time server;
setting, with the time client device, a current time of day of the time client device based on the local time of the time server as included within the synchronization start message, wherein setting the current time of day comprises:
(i) when a fractional portion of a unit seconds portion of a local client time when the time client device received the synchronization start message is greater than a fractional portion of a unit seconds portion of the local time of the time server as included within the synchronization start message, setting the current time of day of the time client device using a same value of the unit seconds portion of the local time of the time server as included within the synchronization start message, and
(ii) when the fractional portion of the unit seconds portion of the local client time when the time client device received the synchronization start message is less than the fractional portion of the unit seconds portion of the local time of the time server as included within the synchronization start message, setting the current time of day of the time client device by adding one second to the value of the unit seconds portion of the local time of the time server as included within the synchronization start message;
after setting the current time of day of the time client device, sending, with the time client device, a synchronization response message to the time server to indicate that the current time of day of the time client device was set based on the local time of the time server as included within the synchronization start message, wherein the synchronization response message includes a local time of the time client device indicating when the time client device sent the synchronization response message; and
receiving, with the time client device, a synchronization success message from the time server when the time server determines that the difference between the local time of the time client device as included in the synchronization response message and a local time of the time server indicating when the time server received the synchronization response message is less than one second, wherein the synchronization success message indicates that the time client device has correctly set its current time of day.

7. The method of claim 6, wherein the local time of the time server indicating when the synchronization start message was sent by the time server, the current time of day of the time client device, and the local time of the time client device indicating when the time client device sent the synchronization response message each comprise unit seconds portions and fractional portions of the unit seconds portions.

8. The method claim 6, further comprising receiving, with the time client device, a clock signal from a clock generator of the time server, wherein determining the current time of day of the time client device and the local time of the time client device indicating when the time client device sent the synchronization response message comprises determining the current time of day of the time client device and the local time of the time client device indicating when the time client device sent the synchronization response message based on the clock signal.

9. The method of claim 6, wherein the time client device comprises a first line card of a router, and wherein the time server comprises a second line card of the router.

10. A network device comprising:
a timing module that determines a local time of the network device indicating when the network device sends a synchronization start message;
at least one interface that sends the synchronization start message to a time client device to set a current time of day on the time client device, receives a synchronization response message from the time client device indicating that the client device received the synchronization start message and performed an operation of setting the current time of day of the time client device based on the local time of the network device as included within the synchronization start message indicating when the network device sent the synchronization start message, and sends a synchronization success message to the time client device indicating that the time client device has correctly set its current time of day,
wherein the synchronization response message includes a local time of the time client device indicating when the synchronization response message was sent by the time client device,
wherein the at least one interface receives a primary reference time, and wherein the timing module determines the local time of the network device indicating when the network device sent the synchronization start message and a local time of the network device indicating when the network device received the synchronization response message based on the primary reference time; and
a clock generator that delivers a clock signal, wherein the clock generator phase shifts at least one of a rising or falling edge of the clock signal such that the at least one of the rising or falling edge occurs at a time subsequent to the primary reference time,
wherein the timing module determines a time difference between the local time of the network device indicating when the network device received the synchronization response message and the local time of the time client device as set based on the local time of the time server as included in the synchronization response message indicating when the synchronization response message was sent by the time client device, and wherein the interface sends the synchronization success message when the timing module determines that the time difference is less than a threshold time value.

11. The network device of claim 10, wherein the threshold time value is one second.

12. The network device of claim 10, wherein the primary reference time comprises a first units seconds portion, and a first fractional portion of the first units seconds portion, wherein the time subsequent to the primary reference time comprises a second units seconds portion, and a second fractional portion of the second units seconds portion, wherein the second units seconds portion comprises a value that is a next consecutive value of the first units seconds portion, and wherein the second fractional portion of the second units seconds portion comprises a value of zero.

13. The network device of claim 10, wherein the local time of the network device indicating when the network device sends the synchronization start message, the local time of the time client device as included in the synchronization response message, and the local time of the network device indicating when the network device received the synchronization response message each comprise unit seconds portions and fractional portions of the unit seconds portions.

14. The network device of claim 10, wherein the network device comprises a first line card of a router, and wherein the time client device comprises a second line card of the router.

15. A network device comprising:
- at least one interface that receives a synchronization start message from a time server, wherein the synchronization start message includes a local time of the time server indicating when the synchronization start message was sent by the time server; and
- a timing module that sets a current time of day of the network device based on the local time of the time server as included within the synchronization start message, and determines a local time of the network device indicating when the network device sends a synchronization response message, wherein the timing module sets the current time of day by:
  - (i) when a fractional portion of a unit seconds portion of a local client time when the time client device received the synchronization start message is greater than a fractional portion of a unit seconds portion of the local time of the time server as included within the synchronization start message, setting the current time of day of the time client device using a same value of the unit seconds portion of the local time of the time server as included within the synchronization start message, and
  - (ii) when the fractional portion of the unit seconds portion of the local client time when the time client device received the synchronization start message is less than the fractional portion of the unit seconds portion of the local time of the time server as included within the synchronization start message, setting the current time of day of the time client device by adding one second to the value of the unit seconds portion of the local time of the time server as included within the synchronization start message,
- wherein after setting the current time of day of the time client device, the at least one interface sends the synchronization response message to the time server to indicate that the current time of day of the network device was set based on the local time of the time server as included within the synchronization start message, and wherein the synchronization response message includes the local time of the network device indicating when the network device sends the synchronization response message, and
- wherein the at least one interface receives a synchronization success message from the time server when the time server determines that the difference between the local time of the network device as included in the synchronization response message and a local time of the time server indicating when the time server received the synchronization response message is less than one second, wherein the synchronization success message indicates that the network device has correctly set its current time of day.

16. The network device of claim 15, wherein the local time of the time server indicating when the synchronization start message was sent by the time server, the current time of day of the network device, and the local time of the network device indicating when the network device sent the synchronization response message each comprise unit seconds portions and fractional portions of the unit seconds portions.

17. The network device of claim 15, wherein the timing module receives a clock signal from the time server, and wherein the timing module sets the current time of day of the network device and determines the local time of the network device indicating when the network device sends the synchronization response message based on the clock signal.

18. The network device of claim 15, wherein the network device comprises a first line card of a router, and wherein the time server comprises a second line card of the router.

\* \* \* \* \*